2,792,334

MERCAPTAN OXIDATION PROCESS

Garbis H. Meguerian, Park Forest, Ill., assignor to Standard Oil Company, Chicago, Ill., a corporation of Indiana No Drawing. Application May 26, 1955,
Serial No. 511,430

15 Claims. (Cl. 196—29)

This invention relates to the catalytic oxidation of mercaptans to disulfides. Also, the invention relates to the sweetening of sour hydrocarbon distillates.

An object of the invention is the conversion of mercaptans to the corresponding disulfides by catalytic oxidation. Another object is a catalyst for the oxidation of mercaptans to disulfides. Still another object is a process for the sweetening of sour hydrocarbon distillates by oxidation of the mercaptan content to disulfides in the presence of an oxidation catalyst. Yet another object is the regeneration of aqueous alkaline mediums containing dissolved mercaptans by oxidizing the mercaptans to disulfides, utilizing a particular mercaptan oxidation catalyst. Other objects will become apparent in the course of the detailed description of the invention.

The mercaptan oxidation catalyst utilized in the process of this invention consists of a complex formed by the reaction of a water-soluble copper salt with an alkylene polyamine, wherein the alkylene group is selected from the class consisting of ethylene and propylene. The mercaptan oxidation process is carried out by contacting an aqueous alkaline medium containing the mercaptan to be converted with free-oxygen in the presence of the copper-complex catalyst; the oxidation is carried out at a temperature normally between about 40° F. and 200° F. The disulfides formed by the oxidation of the mercaptans are decanted away from the aqueous alkaline medium or removed therefrom by washing with a solvent for the disulfides.

Sour petroleum distillates are sweetened by contacting these with an aqueous alkaline medium containing a catalytically effective amount of the defined copper-polyamine complex oxidation catalyst and with free-oxygen. Sufficient aqueous alkaline medium is present to form a distinct separate phase. The contacting is continued for a time and with at least a sufficient amount of free-oxygen to convert essentially all of the mercaptans in the oil to disulfides and thereby produce an essentially sweet oil. The essentially sweet oil is separated from the aqueous phase.

The mercaptan oxidation catalyst utilized in the process of this invention consists of a complex, probably chelate, formed by the reaction of a water-soluble copper salt and a defined alkylene polyamine. The copper salts utilized may be organic or inorganic salts which are appreciably soluble in water. Examples of water-soluble copper salts which are suitable for use in the formation of the catalyst of the invention are cupric acetate, cupric bromate, cupric bromide, cupric chlorate, cupric chloride, cupric fluoride, cupric fluosilicate, cupric formate, cupric lactate, cupric nitrate, cupric sulfate, cupric methanesulfonate, cupric ethanesulfonate, cupric benzenesulfonate, and cupric toluenesulfonate. These salts may be used either in the anhydrous form or in the hydrated form. The widely available and relatively inexpensive cupric sulfate, sold as blue vitriol, i. e., $CuSO_4.5H_2O$, is a preferred water-soluble copper salt.

The other component of the catalyst of this invention is an alkylene polyamine. The alkylene group may be either ethylene or propylene. The alkylene polyamines may contain one or more alkylene groups. It is preferred to utilize those alkylene polyamines which are very water soluble and simultaneously of relatively low oil solubility. Examples of the alkylene polyamines which may be utilized in preparing the catalyst are ethylene diamine, diethylene triamine, triethylene tetramine, tetraethylene pentamine, propylene diamine, dipropylene triamine, tripropylene tetramine, and tetrapropylene pentamine. These alkylene polyamines may be utilized in c. p. grade, the technical grade, or the commercial purities. The commerically available grade of diethylene triamine is a preferred source of alkylene polyamine for use in the preparation of the oxidation catalyst of this invention.

The catalyst is prepared by reacting, in an aqueous medium, the water-soluble copper salt and the alkylene polyamine. Sufficient alkylene polyamine is added to the aqueous medium to complex all of the copper salt. The particular amount of alkylene polyamine added is dependent upon the particular alkylene polyamine being used. It appears that when utilizing ethylene diamine or propylene diamine that the complex is tetrahedral and contains two moles of the diamine and one gram atom of copper ion. More simply, the complex can be prepared by slowly adding the polyamine to a concentrated solution of copper salt in water until a blue precipitate appears. The presence of excess amine in the aqueous medium containing the complex salts out the complex in the form of a blue solid. The aqueous medium containing dissolved complex is a blue color. A complex essentially free of excess polyamine is obtained by decanting the aqueous medium from the precipitated blue solid and drying the solid at moderate temperature. Or a solution of complex in water of known concentration can be prepared by adding polyamine to an aqueous solution of copper salt until the first appearance of precipitate; the precipitate can be redissolved by the addition of water to the preparation vessel. In any event, the presence of excess polyamine has no deleterious effect on the catalytic activity of the copper-polyamine complex.

The mercaptan oxidation is carried out by bringing the mercaptan into solution in aqueous alkaline medium. This aqueous alkaline medium is preferably formed by the solution of an alkali metal hydroxide, such as sodium hydroxide and potassium hydroxide, into water. Solutions containing calcium hydroxide or alkali metal carbonates may also be used. Effective oxidation is also obtainable by utilizing an alkylene polyamine as the alkali agent. Thus it is possible to convert mercaptans per se, or to sweeten hydrocarbon oils by contacting the oil with ethylene diamine containing some water and a catalytic amount of copper-polyamine complex and free-oxygen.

The aqueous alkaline medium may contain substances which increase the solubility of mercaptans in aqueous media. These substances which are mercaptan solubility promoters and frequently referred to as solutizers may be any one of the compounds known for this purpose; however, the use of solubility promoters which react with copper, such as polyphosphates, must be avoided in order to avoid degradation of the catalyst. Examples of the more common solubility promoters are methanol, ethanol, alkyl phenols, potassium isobutyrate, water soluble amines, and alkanolamines. The more common solubility promoters are those phenols derived from petroleum distillates. For example, cresols derived from naphthas, and xylenols derived from heater oils.

The aqueous alkaline medium thus may be any one of those solutions which are commonly utilized in the petroleum industry in the sweetening of sour hydrocarbon distillates by the use of free-oxygen and a mercaptan oxidation promoter. In general, at least enough aqueous alkaline medium is utilized in the sweetening of a sour distillate to form a distinct separate aqueous phase. More than this amount is commonly used, and in general, between about 10 and 100 volume percent of aqueous medium are used, based on sour distillate charged to the sweetening zone.

In the process of this invention, the oxidation is carried out utilizing free-oxygen which may be introduced either as air, cylinder oxygen, or in the form of an oxygen-furnishing compound, such as hydrogen peroxide. At least enough free-oxygen is present in the mercaptan oxidation zone to convert some of the mercaptans to the corresponding disulfides. Usually at least enough free-oxygen is present to convert all of the mercaptans. Or, when sweetening a hydrocarbon distillate, at least enough free-oxygen is present to produce an essentially sweet distillate. Since some sweetening normally takes place in the storage tanks subsequent to the sweetening operation, it is not always necessary to complete the sweetening in the mercaptan oxidation zone.

The copper-polyamine complex catalyst of this invention is not degraded to any significant extent during the mercaptan oxidation or sweetening process and may be reused apparently indefinitely. Further, the catalyst does not need to be protected from oxidation by leaving in the aqueous alkaline medium some mercaptans unoxidized. Thus complete regeneration of mercaptide-containing aqueous medium is obtainable without significant loss of catalyst.

The mercaptan oxidation process is carried out at a temperature between about 40° F. and about 200° F. It is preferred to operate at the lowest temperature that contacting time permits. In general, the lower the temperature of operation, the longer the contacting time needed to obtain complete oxidation of the mercaptan or sweetening of the sour distillate. It is preferred to operate at a temperature between about 60° F. and 90° F.

The mercaptan-containing aqueous alkaline medium may be prepared by dissolving mercaptans as such into the medium. To illustrate: When it is desired to prepare high purity dimethyl disulfide from methyl mercaptan. Or the mercaptans may be obtained by contacting a sour hydrocarbon distillate with an aqueous caustic solution. By this oxidation of the mercaptans in the aqueous alkaline medium, it is possible to recover the disulfides produced.

On the other hand, when it is simply desired to remove the malodorous mercaptans from a sour hydrocarbon distillate by converting them to the bland smelling disulfides, the mercaptan oxidation process, i. e., sweetening process, is carried out by contacting the sour distillate with catalyst containing aqueous alkaline medium in the presence of free-oxygen until the mercaptans have been essentially completely converted to disulfides. The sweet distillate removes the disulfides from the aqueous medium so that the sweet distillate contains disulfides instead of mercaptans. The aqueous medium may then be separated from the sweet distillate and used to treat another batch of sour distillate. It is to be understood that the sweetening of a sour distillate may be batchwise or continuous, utilizing the techniques well known in this art.

The aqueous alkaline medium contains at least a catalytically effective amount of the copper polyamine complex catalyst. In general, the aqueous alkaline medium will contain between about 0.02 and 1 weight percent, calculated as copper, of the catalyst. More usually the catalyst content will be between about 0.1 and 0.2 weight percent as copper. The large amounts of catalyst content have a favorable effect on the rate of mercaptan oxidation. The catalyst may be utilized for the sweetening of substantially any hydrocarbon distillate which contains significant amounts of mercaptans, i. e., is sour to the doctor test. The sour hydrocarbon distillate may be of petroleum origin, or it may be a coal tar distillate. The sour petroleum distillates may be virgin distillates or may be derived from thermal or catalytic conversion processes. The process is particularly suitable for sweetening of stocks which boil below about 700° F. Examples of sour petroleum distillates which are suitable feeds to the sweetening process are virgin naphtha, thermally cracked naphtha, catalytically cracked naphtha, kerosene, diesel fuel, heater oil, and furnace oil.

The results obtainable with the process of the invention are illustrated by the following working examples. These examples are not to be considered as limiting the scope of the invention.

Two types of catalyst polyamine complexes were prepared and utilized. One complex was prepared by dissolving one gram of cupric sulfate pentahydrate in 5 ml. of water and 2 ml. of technical grade ethylene diamine was added to the salt solution. The addition of more ethylene diamine to the solution resulted in the precipitation of a blue solid. The other solution was prepared by adding one gram of cupric sulfate pentahydrate to 8 ml. of water and 7 ml. of diethylene triamine. The addition of more polyamine caused the precipitation of a blue solid. In all cases, the copper polyamine complex containing aqueous media were deep blue in color. To prepare the catalyst containing aqueous alkaline media, portions of the preformed complex solutions were added to the aqueous alkaline media.

Tests were carried out on the oxidation of mercaptide solutions prepared by aqueous caustic contacting of sour cracked naphtha. Tests were carried out on sweetening of sour distillates using: a virgin naphtha boiling over the range of about 100° F. to 325° F.; a thermally cracked heavy naphtha boiling over the range of about 200° F. to 400° F.; a sour catalytically cracked naphtha boiling over the range of about 200° F. to 400° F.; a sour heater oil boiling over the range of about 325° F. and 550° F.

TEST 1

In this test, a rich solution prepared by the contacting of a sour thermally cracked naphtha with an aqueous caustic solution containing about 12 weight percent sodium hydroxide and about 10 volume percent of petroleum cresols was regenerated by treatment at various temperatures. The rich mercaptide-containing solution was placed in a vessel and heated to the desired temperature of regeneration; air was introduced into the vessel while the vessel was being stirred by a propeller stirrer. At each temperature the contacting was maintained for 10 minutes. At each temperature solution with and without catalyst was contacted for purposes of comparison. The catalyst utilized in this test was a copper-diethylene triamine complex and the catalyst-containing rich solution contained 0.5 weight percent of copper. The activity of the catalyst was determined by measuring the amount of mercaptan sulfur oxidized as milligrams. The results of this test are set out in Table A below.

Table A

| Run No. | Temperature, °F. | Mercaptan Sulfur Oxidized, mg. | |
|---|---|---|---|
| | | No Catalyst | Catalyst |
| 1 and 2 | 90 | 25 | 110 |
| 3 and 4 | 110 | 51 | 125 |
| 5 and 6 | 130 | 98 | 152 |

Runs 1 and 2 show that the catalyst-containing solution converted more than 4 times as much mercaptan as the non-catalyzed solution. It is pointed out that petroleum cresols are generally considered to be fair mercaptan oxidation catalysts in their own right. The conversion in Runs 4 and 6 as compared with 3 and 5 are not as favorable owing to the fact that the higher temperature of operation in these runs favors the less active system more than it did the catalyst containing system. These runs show that the copper-diethylene triamine complex is an extremely effective mercaptan oxidation catalyst.

TEST 2

In this test, virgin naphtha having a mercaptan number of 19.9 (mg. of mercaptan sulfur per 100 ml. of naphtha) was sweetened. 100 ml. of ethylene diamine containing about 30 volume percent of water and sufficient copper-ethylene diamine complex to introduce 0.07 weight percent of copper into the solution was contacted with 250 ml. of the virgin naphtha. At 70° F. the naphtha was sweetened in 10 minutes. The aqueous phase was decanted from the sweet naphtha and used to sweeten another batch of sour naphtha. This was repeated until 4 batches of sour naphtha had been sweetened. In each instance, the sweetening time was 10 minutes. This test shows that alkylene polyamine-alkaline solution is an effective aqueous alkali medium and also shows that the alkaline medium can be reused several times without loss of catalyst activity.

TEST 3

In this test, the sour hydrocarbon distillate was a West Texas heater oil having a mercaptan number of 50. The aqueous alkaline solution consisted of 30 ml. of 20% NaOH, 20 ml. of commercial ethylene diamine, and 5 ml. of copper-diethylene triamine complex solution. The aqueous alkaline solution contained 0.4 weight percent of copper. The contacting was carried out at a temperature of 110° F. and the heater oil was sweet after 35 minutes. The color of the sweet heater oil was water white. This test shows that the process of the invention is effective on sweetening what is generally considered to be the most refractory type of stock present in commercial refinery operations, namely a very high sulfur, high boiling distillate.

TEST 4

In this test, a West Texas heater oil having a mercaptan number of 87 was the feed. The aqueous alkaline solution contained 40 volume percent of ethylene diamine and the remainder 20% sodium hydroxide-water solution. The aqueous medium contained copper-diethylene triamine complex equivalent to 0.2 weight percent of copper. At a temperature of 95° F. a sweet oil was produced in 65 minutes.

TEST 5

In this test, the possible carryover of copper with the sweet distillate was investigated. The sour distillate was a thermally cracked heavy naphtha which had been extracted with aqueous caustic-cresylate solution to a mercaptan number of 5. The sour thermally cracked naphtha was contacted at 75° F. with an aqueous alkaline solution containing 0.1 weight percent as copper of the copper-ethylene diamine catalyst. The naphtha was sweet in about 6 minutes. The sweet naphtha was inhibited with 2 pounds per 1000 barrels of commercial N—N′ di-sec-butyl-p-phenylene diamine and the ASTM induction period test run on the inhibited naphtha. The induction period was 145 minutes. Another sample of the sweet oil was inhibited with 2 pounds per 1000 barrels of the phenylene diamine inhibitor and 2 pounds per 1000 barrels of commercial metal deactivator. The induction period of the metal deactivator containing sweet naphtha was 145 minutes. The fact that the metal deactivator did not improve the induction period shows that no copper had been carried over into the sweet oil from the sweetening zone.

TEST 6

In this test, the effect of concentration of catalyst in the aqueous solution on the sweetening time was studied. The sour distillate was a thermally cracked heavy naphtha having a mercaptan number of 7. The contacting temperature was 75° F.; the catalyst was a copper-diethylene triamine complex; the aqueous solution contained petroleum cresols in addition to sodium hydroxide. The concentration of catalyst calculated as copper and the corresponding time in minutes needed to produce a sweet naphtha is set out in Table B below.

Table B

| Copper, wt., percent: | Sweetening time, min. |
|---|---|
| 0.0 | 40 |
| .02 | 32 |
| .05 | 15 |
| .10 | 10 |
| .20 | 7 |

These data show that the sweetening rate is increased five-fold by the presence of only 0.2 weight percent of copper as compared with the solution containing no copper catalyst.

TEST 7

In this test, the effect of sweetening on the color stability of the sweet distillate was studied. The feed was a thermal naphtha having a mercaptan number of 7 and a color of +14 Saybolt. The test was carried out at 75° F. The aqueous alkaline solution contained 12 volume percent of petroleum cresols and 13 weight percent of sodium hydroxide. In one run, cupric chloride was dissolved in the aqueous solution and the sour naphtha sweetened. In another run, copper-ethylene diamine complex was dissolved in the aqueous solution and the oil sweetened. In each run, 0.4 weight percent of copper was present. The sweetening time in each run was about 6 minutes. The sweet oil was water washed to remove occluded aqueous solution and then was maintained at about 72° F. for 24 hours exposed to the atmosphere. The color of the oil after the 24 hour exposure was determined. The results of these runs are set out in Table C below.

Table C

| Run No. | Catalyst | Aged Color |
|---|---|---|
| 7 | CuCl₂ | 2½ ASTM. |
| 8 | Cu-EDA | ca. 0 ASTM. |

These runs show that the copper-polyamine complex catalyst of this invention has very little deleterious effect on the color stability of such an insensitive material as a thermally cracked naphtha. Although the cupric chloride catalyst is very effective in sweetening, Run No. 7 shows that the sweet naphtha is extremely unstable with respect to color.

The above working examples show that the copper-alkylene polyamine complex is an extremely active catalyst for the oxidation of mercaptans to the corresponding disulfides and that the catalyst has no significant deleterious effects on oil sweetened utilizing the catalyst and also that the catalyst-containing solution may be reused many times without loss in oxidation activity.

Thus having described the invention, what is claimed is:

1. A process for converting mercaptans to disulfides which comprises contacting an aqueous alkaline medium containing a mercaptan with free-oxygen at a temperature between about 40° F. and 200° F., in the presence of a mercaptan oxidation catalyst consisting of the complex formed by the reaction of a water-soluble copper salt and an alkylene polyamine wherein the alkylene group is selected from the class consisting of ethylene and propylene.

2. The process of claim 1 wherein said polyamine is ethylene diamine.

3. The process of claim 1 wherein said polyamine is diethylene triamine.

4. The process of claim 1 wherein said polyamine is dipropylene triamine.

5. The process of claim 1 wherein said salt is cupric sulfate.

6. The process of claim 1 wherein said salt is cupric chloride.

7. The process of claim 1 wherein said temperature is between about 60° F. and 90° F.

8. The process of claim 1 wherein said catalyst is present in an amount of between about 0.02 and 1 weight percent, as copper, based on aqueous alkaline medium.

9. A process for sweetening sour hydrocarbon distillate which comprises contacting said distillate, at a temperature between about 40° F. and 200° F., with an amount of an aqueous alkaline medium sufficient to form a distinct, separate aqueous phase, which medium contains between about 0.02 and 1 weight percent, as copper, of a catalyst formed by the reaction of a water soluble copper salt and an alkylene polyamine where the alkylene group is selected from the class consisting of ethylene and propylene, and with free-oxygen in an amount at least sufficient to convert essentially all of the mercaptans in said distillate to disulfides, for a time at least sufficient to essentially sweeten said distillate and separating an essentially sweet oil from an aqueous phase.

10. The process of claim 9 wherein said temperature is between 60° F. and 90° F.

11. The process of claim 9 wherein the catalyst content is between about 0.1 and 0.2 weight percent.

12. The process of claim 9 wherein said distillate is a virgin petroleum naphtha.

13. The process of claim 9 wherein said distillate is a cracked petroleum naphtha.

14. The process of claim 9 wherein said distillate is a heater oil.

15. The process of claim 9 wherein said distillate is a kerosene.

References Cited in the file of this patent
UNITED STATES PATENTS

| | | |
|---|---|---|
| 2,432,301 | Fetterly | Dec. 9, 1947 |
| 2,663,674 | Krause et al. | Dec. 22, 1953 |